US012429168B2

(12) United States Patent
Orlandi

(10) Patent No.: US 12,429,168 B2
(45) Date of Patent: Sep. 30, 2025

(54) SYSTEM INJECTING GAS INTO A STORAGE TANK

(71) Applicant: GAZTRANSPORT ET TECHNIGAZ, Saint Remy les Chevreuse (FR)

(72) Inventor: Ezequiel Orlandi, Saint Remy les Chevreuse (FR)

(73) Assignee: GAZTRANSPORT ET TECHNIGAZ, Saint Remy les Chevreuse (FR)

(*) Notice: Subject to any disclaimer, the term of this patent is extended or adjusted under 35 U.S.C. 154(b) by 0 days.

(21) Appl. No.: 18/721,496

(22) PCT Filed: Dec. 19, 2022

(86) PCT No.: PCT/FR2022/052414
§ 371 (c)(1),
(2) Date: Jun. 18, 2024

(87) PCT Pub. No.: WO2023/118713
PCT Pub. Date: Jun. 29, 2023

(65) Prior Publication Data

US 2025/0060073 A1 Feb. 20, 2025

(30) Foreign Application Priority Data

Dec. 22, 2021 (FR) ....................................... 2114223

(51) Int. Cl.
*F17C 3/06* (2006.01)
*F17C 13/12* (2006.01)

(52) U.S. Cl.
CPC .............. *F17C 3/06* (2013.01); *F17C 13/126* (2013.01); *F17C 2201/0119* (2013.01); *F17C 2203/0304* (2013.01); *F17C 2260/038* (2013.01)

(58) Field of Classification Search
CPC ...... F17C 3/00; F17C 3/02; F17C 3/04; F17C 3/06; F17C 13/12; F17C 13/126;
(Continued)

(56) References Cited

U.S. PATENT DOCUMENTS 4,296,799 A * 10/1981 Steele ................. B29C 44/1242
264/45.2
11,467,055 B2 * 10/2022 Tos ........................ G01M 3/226
(Continued)

FOREIGN PATENT DOCUMENTS

FR 2 662 800 A1 12/1991
FR 2 739 675 A1 4/1997
(Continued)

OTHER PUBLICATIONS

International Search Report issued Mar. 31, 2023 in PCT/FR2022/052414 filed Dec. 19, 2022, 3 pages.

*Primary Examiner* — Javier A Pagan
(74) *Attorney, Agent, or Firm* — Oblon, McClelland, Maier &Neustadt, L.L.P.

(57) ABSTRACT

A storage tank containing a fluid, the liquefaction temperature of which is lower than −50° C. under atmospheric pressure and having a cylindrical shape around an axis of revolution, the storage tank includes at least one thermal insulation barrier covered with a sealed and corrugated membrane which is made of a plurality of corrugations. These corrugations delimit a space between the corrugations and at least one thermal insulation barrier. The storage tank includes at least one system injecting gas into the space, the gas injection system including at least one circular pipe spreading around the axis of revolution of the storage tank and a nozzle linked to the circular pipe.

20 Claims, 2 Drawing Sheets

Figure 1:
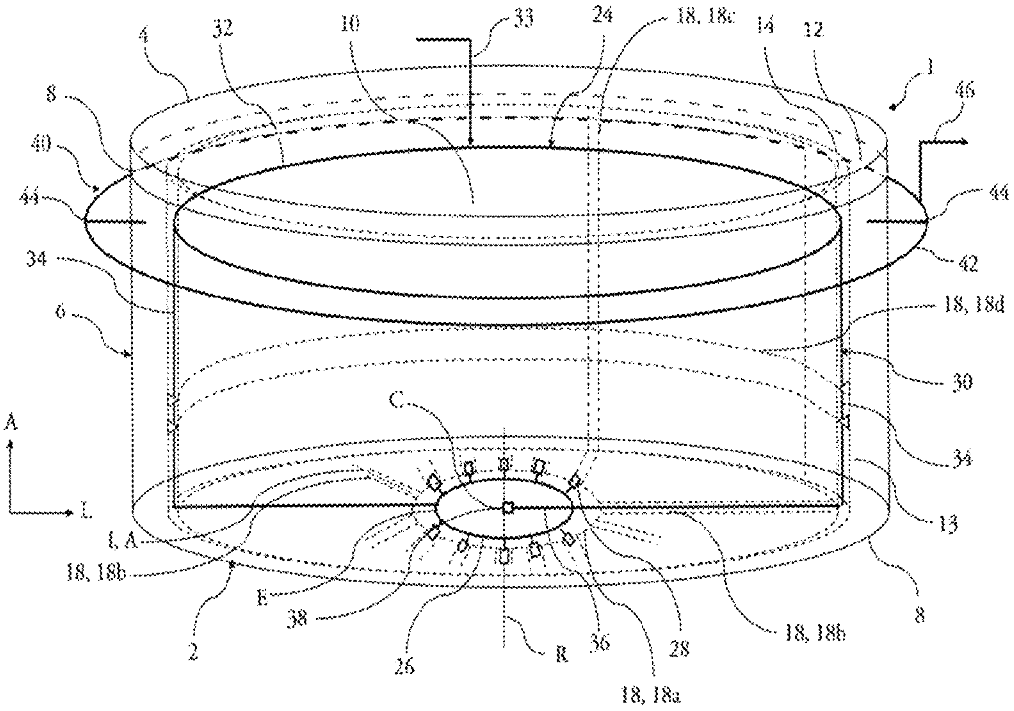

(58) Field of Classification Search
CPC .............. F17C 2201/00; F17C 2201/01; F17C 2201/0104; F17C 2201/0119; F17C 2203/03; F17C 2203/0304; F17C 2260/03; F17C 2260/035; F17C 2260/038
See application file for complete search history.

(56) References Cited

U.S. PATENT DOCUMENTS

| | | | |
|---|---|---|---|
| 2021/0364381 A1 | 11/2021 | Tos et al. | |
| 2024/0246881 A1* | 7/2024 | Huh | C05F 17/929 |

FOREIGN PATENT DOCUMENTS

| | | | | |
|---|---|---|---|---|
| FR | 3084347 A1 * | 1/2020 | | F17C 1/002 |
| KR | 10-2017-0038233 A | 4/2017 | | |
| KR | 10-2019-0081550 A | 7/2019 | | |
| WO | WO 2019/180373 A1 | 9/2019 | | |
| WO | WO-2019180372 A1 * | 9/2019 | | G01M 3/226 |
| WO | WO 2020/229777 A1 | 11/2020 | | |

* cited by examiner

SYSTEM INJECTING GAS INTO A STORAGE TANK

The present invention relates to a system injecting gas into a storage tank containing a fluid, the liquefaction temperature of which is lower than −50° C. under atmospheric pressure and, more specifically, a system injecting gas into a space beneath a sealed and corrugated membrane of this storage tank, as well as a gas extraction system.

The tanks used for storing fluids, the temperature of which is lower than −50° C. under atmospheric pressure, enable to store these fluids before, during or after transportation. Such storage tanks usually include at least one thermal insulation barrier covered with the sealed and corrugated membrane including a plurality of corrugations. The thermal insulation barrier as well as the corrugated membrane both at least are used for delimiting an inner volume of the storage tank in the fluid is stored. The thermal insulation barrier together with the sealed and corrugated membrane also enable fluid storage in the best storage conditions in both terms of temperature and pressure.

It is understood that since the sealed and corrugated membrane is directly in contact with fluids in such storage tanks, it must keep its sealing properties to enable efficient storage of fluid, the liquefaction temperature of which being lower than −50° C. under atmospheric pressure. Therefore, tightness of the sealed corrugated membrane is usually checked by injecting gas between the sealed and corrugated membrane and the thermal insulation barrier inside the storage tank to verify tightness of this sealed and corrugated membrane. Moreover, gas can also be injected during tank inerting processes, which means when a fluid is kept in the storage tank inner volume. The inerting process allows, inter alia, sweeping of inert gas in the space located beneath the sealed and corrugated membrane to make sure that the sealed and corrugated membrane is tight.

The means that are currently used for checking tightness of the sealed and corrugated membrane and/or for storage tank inerting, have however the drawback to be difficult to carry out and show results that have a reliability rate which needs to be improved. Furthermore, such means are expensive due to their structural complexity and the required adaptation to the various types of storage tanks.

The purpose of this invention is thus to suggest a solution to improve and to present easier means for checking tightness of the sealed and corrugated membrane and/or for inerting the storage tank containing fluid, the liquefaction temperature of which is lower than −50° C. under atmospheric pressure.

The invention relates to a storage tank containing a fluid, the liquefaction temperature of which is lower than −50° C. under atmospheric pressure, the storage tank being in the shape of a cylinder around an axis of revolution and fitted with a bottom wall, an upper wall and a peripheral cylindrical wall linking both bottom and upper walls, said storage tank comprising at least one thermal insulation barrier covered with a sealed and corrugated membrane in such a way that the sealed and corrugated membrane delimits an inner volume of the storage tank, the sealed and corrugated membrane including a plurality of corrugations that are used to delimit a space between said corrugations and the at least one thermal insulation barrier, the storage tank including at least gas injection system injecting gas into the space, characterized in that the gas injection system comprises at least one circular pipe spreading around the axis of revolution of the storage tank, said circular pipe being located in the space delimited by the corrugations of the sealed and corrugated membrane of the bottom wall and the thermal insulation barrier, the gas injection system comprising at least one nozzle linked, flow-wise, to the circular pipe and in such a way that the at least one nozzle injects gas beneath the corrugations of the sealed and corrugated membrane.

The storage tank as described by the invention allows storage, for example and in a non-limited manner, of liquefied natural gas and the tank is preferably a land storage tank.

It is understood that the circular pipe of the gas injection system is spreading around the axis of revolution of the storage tank, with this axis of revolution passing through a perimeter defined by the circular pipe.

Gas is injected by the at least one nozzle into the space formed between the corrugations of the sealed and corrugated membrane and the thermal insulation barrier makes it possible to check tightness of the sealed and corrugated membrane by using extra means that are placed, for example inside the inner volume, and capable of detecting gas inside this inner volume, which means a leak is existing from the sealed and corrugated membrane, and more specifically at the membrane weld bead. In such an event, the gas being injected can be tracer gas such as ammonia or helium gas.

It is also understood that injecting gas by the at least one nozzle into the space beneath the corrugations enables spreading of this gas into an insulation volume of the storage tank. To be more specific, the insulation volume of the storage tank includes the thermal insulation barrier together with the space formed between the sealed and corrugated membrane and this thermal insulation barrier. It is thus understood that the insulation volume comprises the space beneath the membrane corrugations, as indicated above, as well as the space included between the thermal insulation barrier and flat sections of the sealed and corrugated membrane, in addition to the volume defined by the thickness of the thermal insulation barrier.

Consequently, the injection system according to the invention allows to fill the whole insulation volume of the storage tank by means of the at least one nozzle located in the space formed between the corrugations of the sealed and corrugated membrane and the thermal insulation barrier.

Furthermore, such an injection of gas into this space can be used during an inerting process, with a fluid contained in the inner volume of the tank, the liquefaction temperature of which is lower than −50° C. under atmospheric pressure. According to non-limiting examples of the invention, the type of gas used for sweeping or inerting can be nitrogen.

According to a characteristic of the invention, the gas injection system includes at least one supply system supplying gas to the circular pipe, the supply system comprising at least one distribution ring spreading around the axis of revolution.

It is understood that the gas injection system enables gas transportation from one gas storage unit located outside the tank to, at least, the circular pipe in such a way that gas is injected through the at least one nozzle.

According to the first example described by the invention, the distribution ring can be placed in the peripheral wall of the storage tank. According to the second example described by this invention, the distribution ring can be placed in the upper wall of the storage tank. More precisely according to this second example, the distribution ring can spread in the peripheral edge of the upper wall, the peripheral edge of the upper wall being the area of the upper wall in contact with the peripheral wall.

In all cases, the purpose of the distribution ring is to conduct gas around the tank in order to distribute gas to the circular supply pipe, at least at two points.

Alternatively, the storage tank can include a supply device placed in the inner volume of the storage tank and that is linked, flow-wise, to the circular pipe. Such a supply device can be added to the supply system that includes the distribution ring, especially when operating the process of checking tightness of the sealed and corrugated membrane, for example, to inject more gas into the circular pipe.

According to a characteristic of the invention, the supply system comprises at least one supply pipe extending mainly in the space of the peripheral wall and in such a way that this supply pipe connects, flow-wise, both the circular pipe and the distribution ring.

It is understood that the supply pipe is extending at least in the peripheral wall and in the bottom wall of the storage tank. Furthermore, the supply system can include two supply pipes spreading opposite each other with respect to the axis of revolution of the storage tank.

According to a characteristic of the invention, the bottom wall includes a peripheral edge and a center aligned with the axis of revolution of the storage tank, the circular pipe being closer to the center of the bottom wall than to the peripheral edge.

It is understood that the peripheral edge of the bottom wall corresponds to an area where the bottom wall and the peripheral wall are both in contact.

According to a characteristic of the invention, the at least one nozzle is injecting gas beneath the corrugations of the sealed and corrugated membrane of the bottom wall and in direction of the peripheral edge. The gas is thus sweeping or filling the space and the insulation volume in direction of the peripheral wall, in such a way that the gas flow follows it to reach the upper part of the storage tank.

According to a characteristic of the invention, the sealed and corrugated membrane is configured in such a way that its corrugations formed at the peripheral wall are in communication, flow-wise, with its corrugations formed at the bottom wall.

It is understood that such a characteristic enables the gas that is injected by the at least one nozzle to flow beneath all the corrugations of the sealed and corrugated membrane when this gas flow is pushed in direction of the peripheral edge of the bottom wall.

In addition, the entire insulation volume of the storage tank is configured in such a way that this volume is connected, flow-wise and at least, with the insulation volume of the bottom wall and the insulation volume of the peripheral wall. This is thus possible by injecting gas into the space beneath the corrugations of the sealed and corrugated membrane of the bottom wall and in direction of the peripheral edge, to sweep or fill the insulation volume of the bottom wall and of the peripheral wall with this gas, including in the thick part of the insulation space of these walls.

According to a characteristic of the invention, the at least one nozzle is adapted to reduce gas pressure at the outlet of said nozzle compared to gas pressure at the inlet of said nozzle.

In other words, it is understood that the inlet area of the at least one nozzle is strictly lower than the outlet area of said nozzle. Such a characteristic of the invention, enables, for example but not in a restrictive way, to obtain a nozzle outlet gas pressure of 25 mbar while the nozzle inlet pressure is 200 mbar.

According to a characteristic of the invention, the at least one nozzle is placed away from the circular pipe, at a distance ranging from 200 mm to 5000 mm.

But preferably, the at least one nozzle is placed at a distance ranging from 400 mm to 600 mm.

Placing the nozzle in this way with respect to the circular pipe makes it possible to guarantee a stable gas flow rate, at least in the circular pipe and at the nozzle outlet.

According to a characteristic of the invention, the sealed and corrugated membrane, at least, placed on the bottom wall comprises circular corrugations spreading around the axis of revolution of the storage tank and radial corrugations crossing the circular corrugations, and extending in a radial direction of the storage tank, the circular pipe extending at least beneath one of the circular corrugations of the sealed and corrugated membrane.

It is understood that the circular and radial corrugations are all in communication flow-wise. It is also understood that the sealed and corrugated membrane of the peripheral wall may include a similar distribution of its corrugations and in such a way that it includes circular corrugations as well as axial corrugations, crossing its circular corrugations and spreading along the vertical axis of the storage tank, the axial corrugations of the sealed and corrugated membrane of the peripheral wall being aligned with the radial corrugations of the sealed and corrugated membrane of the bottom wall. In other words, the radial corrugations located on the bottom wall and the axial corrugations located on the peripheral wall are communicating flow-wise each other.

According to a characteristic of the invention, an injection axis of the at least one nozzle is aligned with the main axis of a radial corrugation of the sealed and corrugated membrane placed on the bottom wall.

According to what has been described above, we can deduct that the nozzle is placed in such a way that gas can be injected into the corrugations of the sealed and corrugated membrane of the bottom wall. Consequently, the injected gas can spread in it and in the insulation volume of the peripheral wall without any other obstacle than pressure loss.

According to a characteristic of the invention, the at least one supply pipe is extending in the space beneath one of the radial corrugations of the sealed and corrugated membrane of the bottom wall. According to an example of the invention, at least one supply pipe can spread in the space delimited by one axial corrugation of the sealed and corrugated membrane on the peripheral wall.

According to a characteristic of the invention, the gas injection system comprises at least one injection device spreading within a perimeter delimited by the circular pipe.

More specifically, the injection device is extending beneath one radial corrugation of the bottom wall, in the space delimited between this radial corrugation of the sealed and corrugated membrane and the thermal insulation barrier.

According to a characteristic of the invention, the at least one injection device comprises at least one additional nozzle placed at one of its ends located inside the perimeter delimited by the circular pipe, said additional nozzle injecting gas at least into the perimeter delimited by the circular pipe.

The advantage of this characteristic is to enable gas injection into the entire space delimited by the sealed and corrugated membrane and the thermal insulation barrier, as well as into the entire insulation space of the bottom wall and of the peripheral wall of the storage tank.

According to a characteristic of the invention, the storage tank includes a plurality of nozzles placed around the circular pipe and in such a way that each nozzle is distant from one another with respect to an angle ranging between 25° to 70° around the axis of revolution of the storage tank.

In this way, the gas is homogeneously distributed in the space beneath the corrugations of the sealed and corrugated membrane and in the insulation volume of the storage tank in order to improve tightness checking processes of the sealed and corrugated membrane and/or storage tank inerting processes.

Another advantage is to provide with at least one extraction system provided with at least one circular extraction pipe which is extending around the axis of revolution of the storage tank, outside of its inner volume, the extraction system including at least one extraction pipe partly that passes through, at least partly, the peripheral wall of the storage tank and up to the thermal insulation barrier, the extraction pipe being linked, flow-wise, to the circular extraction pipe.

According to an example, the extraction system includes two extraction pipes placed at an angle of 180° from one another. The circular extraction pipe is extending around the peripheral wall of the storage tank and is linked to a device collecting or analyzing gas, in order to collect and/or analyze the gas discharged from, at least, the insulation volume of the storage tank. Such an extraction system can be used during tightness checking process and/or during inerting process as mentioned above.

The invention also relates to a process for checking the tightness of the sealed and corrugated membrane of the storage tank in compliance with one of the above-mentioned characteristics; this process using at least the gas injection system. The tightness control process is the one used for checking tightness of the welded bead between the various layers forming the sealed and corrugated membrane. Using the gas injection system whilst checking tightness of the sealed and corrugated membrane constitutes an advantage since the entire insulation volume of the storage tank is filled and the reliability of this process is thus optimized.

The purpose of this invention is also to develop a process for sweeping an insulation volume of the storage tank according to one of the above-mentioned characteristics, this process using at least the gas injection system. The sweeping process, also called inerting process, consists in renewing the gas volume that exists in the thermal insulation barrier or between this barrier and the sealed and corrugated membrane. To do so, this space is swept with inert gas. The invented injection system is thus an advantage since the gas injected by at least one of the nozzles is swept on the entire insulation volume of the storage tank including the thermal insulation barrier and the space between the sealed and corrugated membrane and this barrier.

Finally, this invention is offering a process for injecting gas into a space of a storage tank according to one of the above-mentioned characteristics. Gas is thus injected into the gas injection system in such a way that the gas flows at least inside the circular pipe at a pressure ranging between 170 mbar and 230 mbar and in such a way that gas goes out by at least one nozzle at a pressure ranging between 20 mbar and 30 mbar.

It is understood that gas is spread, at the outlet of the nozzle, in the space beneath the corrugations of the sealed and corrugated membrane as well as in the insulation volume of the storage tank.

Figure 2:
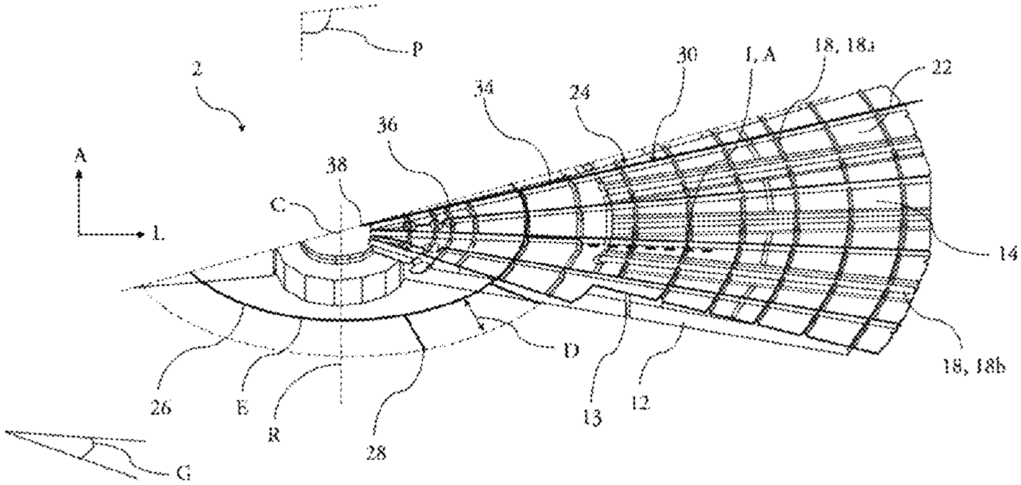
Figure 3:
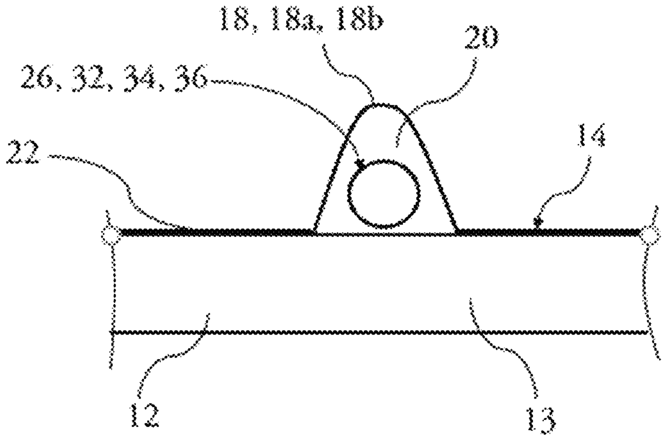

More characteristics, details and advantages of the invention will be clearly presented in the description and on the drawings below:

FIG. 1 provides a general schematic view of a storage tank including a gas injection system as described according to the invention;

FIG. 2 provides a closer view of one part of the bottom wall of the storage tank showing a circular pipe and at least one nozzle of the gas injection system described on FIG. 1;

FIG. 3 provides a cross-sectional view of a corrugation of the storage tank sealed and corrugated membrane as shown on FIG. 1, where the gas injection system is partly extending in a space.

It should be first noted that if the figures show the invention in detail for usage purposes, these figures can also be used for defining the invention more clearly if need be. It also should be noted that these figures only show a few embodiments in which the invention is used.

FIG. 1 shows a tank 1 used for storing a fluid, the liquefaction temperature of which is lower than −50° C. under atmospheric pressure, for example, liquefied natural gas or ammonia, the storage tank 1 being specifically used for a land fluid storage. The storage tank 1 as described by the invention has a circular cylindrical shape around an axis of revolution R and is fitted with a bottom wall 2, an upper wall 4 and a peripheral wall 6 interconnecting both bottom and upper walls. More specifically, the bottom wall 2 and the upper surface 4 are opposite to one another along the axis of revolution R of the storage tank 1 and the peripheral wall 6 is spreading in such a way that it connects the peripheral edge 8 of both the bottom wall 2 and the upper wall 4, one to another. The bottom wall 2, the upper wall 4 and the peripheral wall 6 as mentioned above make it possible to delimit an inner volume 10 of the storage tank 2 containing the fluid, the liquefaction temperature of which is lower than −50° C. under atmospheric pressure.

The storage tank 2 as described by the invention includes at least one thermal insulation barrier 12 covered with the sealed and corrugated membrane 14 and in such a way that the sealed and corrugated membrane 14 is in contact with the inner volume 10 of the storage tank 1. The insulation volume 13 of the storage tank 1 is defined by the fact that it includes at least the thermal insulation barrier 12 and the space formed between the sealed and corrugated membrane 14 and said barrier.

Furthermore, it is understood that this storage tank 1 can include more than one thermal insulation barrier, i.e., a first thermal insulation barrier, a second thermal insulation barrier and a secondary sealed membrane placed between these two insulation barriers, all those barriers together with the secondary sealed membrane being part of the insulation volume of the storage tank.

The thermal insulation barrier 12 reduces heat loss of the storage tank 1 and therefore guarantees optimum storage of the fluid, the liquefaction temperature of which is lower than −50° C. under atmospheric pressure in the storage tank 1.

The sealed and corrugated membrane 14 as described by the invention guarantees tightness of the storage tank since this fluid is safely kept in the inner volume 10 of the tank 2. The sealed and corrugated membrane 14 is made of flat sections 22 as well as a plurality of corrugations 18, as shown on FIGS. 2 and 3, surrounding the flat sections.

It is understood that corrugation 18 means deformation of the sealed and corrugated membrane 14 perpendicularly to principal plane P of the sealed and corrugated membrane 14 and in which are included flat sections 22. For example, for the bottom wall 2, the corrugations 18 of the sealed and corrugated membrane 14 correspond to a deformation in the axial direction A of the storage tank 1 and parallel to the axis of revolution R. The corrugations 18 of the sealed and corrugated membrane 14 have a concave shape as shown on a section perpendicular to principal plane P of the sealed and corrugated membrane 14.

According to the example of the invention, the thermal insulation barrier 12 and the sealed and corrugated membrane 14 are extending at least against the bottom wall 2 and the peripheral wall 6 of the storage tank 1. This specific configuration makes the storage tank 1 more resistant to stresses caused by storage of the fluid, the liquefaction temperature of which is lower than −50° C. under atmospheric pressure, and more specifically resistant to thermal shrinkage when the storage tank is prepared by cold temperatures or to hydrostatic pressure caused when transferring the fluid into the tank.

According to the invention, the plurality of corrugations 18 are used to delimit a space 20 between these corrugations 18 and the at least one thermal insulation barrier 12, as shown on FIG. 3. More precisely, the sections of the sealed and corrugated membrane 14 that have not been deformed, create the flat sections 22 extending in the principal plane P of the sealed and corrugated membrane 14 and being in contact with the thermal insulation barrier 12. It is thus understood that the corrugations 18 of the sealed and corrugated membrane 14 enable, inter alia, the creation of the space 20 between these corrugations 18 and the thermal insulation barrier 12.

As clearly shown on FIG. 2, the sealed and corrugated membrane 14 located on the bottom wall 2 of the storage tank 1 includes circular corrugations **18*a* that extend around the axis of revolution R of the storage tank 1, as well as radial corrugations 18*b*, crossing the circular corrugations 18*a* and extending in radial direction L of the storage tank 1. Furthermore, it is understood that the radial corrugations 18*b* and the circular corrugations 18*a* of the sealed and corrugated membrane 14 are communicating with one another flow-wise. Placing the sealed and corrugated membrane 14 in this way on the bottom wall 2 particularly enables this membrane to adapt to the specific cylindrical shape of the storage tank 1**.

Moreover, the peripheral wall 6 of the storage tank 1, as shown on FIG. 1, comprises the circular corrugations **18*d* and axial corrugations 18*c*, crossing the circular corrugations 18*d* and extending in the axial direction of the storage tank 1. More specifically, the sealed and corrugated membrane 14 is configured in such a way that the radial corrugations 18*b* on the bottom wall 2 and the axial corrugations 18*c* on the peripheral wall 6 are aligned with one another so that they are communicating flow-wise. It is understood that the space 20 created between the corrugations 18 of the sealed and corrugated membrane 14 and the thermal insulation barrier 12 is common, flow-wise to the entire storage tank 1 where the sealed and corrugated membrane 14** is placed.

Furthermore, it is understood that the insulation volume 13 of the storage tank 1, located on the bottom wall 2, is in contact, flow-wise, with the insulation volume 13 located on the peripheral wall 6.

According to the invention, the storage tank 1 includes at least one injection system 24, through which gas is injected into the space 20 as described above. Such a gas injection system 24 is specifically used during the storage tank 1 inerting processes or when checking tightness of the sealed and corrugated membrane 14. The type of gas injected by the injection system 24 can be either nitrogen or ammonia, or even a tracer gas which can be noticed in the event of a leak at a weld. Furthermore, it is understood that during such inerting or tightness checking processes, other means than the injection system are used, such as a gas extraction system that shall be described further below.

The gas injection system 24 as described by the invention and as shown on FIGS. 1 to 3, includes at least one circular pipe 26 which extends around the axis of revolution R of the storage tank 1. In other words, the axis of revolution R of the storage tank 1 goes through a perimeter E defined by the circular pipe 26.

The circular pipe 26 is spreading in the space 20 between the corrugations 18 of the sealed and corrugated membrane 14 of the bottom wall 2 and the thermal insulation barrier 12. More precisely, the circular pipe 26 is extending in the space 20 formed between one of the circular corrugations **18*a* of the sealed and corrugated membrane 14 spreading on the bottom wall 2 and the thermal insulation barrier 12**.

Centre C of the bottom wall 2 is defined in a way that it is aligned with the axis of revolution R of the storage tank 1. The circular pipe 26 is thus closer to center C of the bottom wall 2 than to its peripheral edge 8 as mentioned above. According to a nonlimiting example of the invention, the circular pipe 26 is extending within a radius included between 2 m et 2.5 m from center C on the bottom wall 2. Placing the pipe closer to center C than to the peripheral edge 8 ensures gas supply to most part of the radial corrugations **18*b* of the bottom wall 2**.

According to the invention, the gas injection system 24 includes at least one nozzle 28 linked to the circular pipe 26 flow-wise and in such a way that at least one nozzle 28 is injecting gas beneath the corrugations 18 of the sealed and corrugated membrane 14. More specifically, an injection axis I of the nozzle 28, as shown on FIG. 1 or 2, is aligned with the principal axis A of a radial corrugation **18*b* of the sealed and corrugated membrane 14 placed on the bottom wall 2**.

It is understood that gas is injected through the at least one nozzle 28 into the space 20 as defined above. More specifically, the at least one nozzle 28 is injecting gas into the space 20 beneath the corrugations 18 of the sealed and corrugated membrane 14 of the bottom wall 2 and in direction of its peripheral edge 8. Such a characteristic of the nozzle 28 enables the injected gas to flow inside the space 20 formed under the corrugations 18 of the sealed and corrugated membrane 14 spreading on the bottom wall 2 and to continue till the peripheral wall 6. It is also understood that such a feature of the nozzle 28 enables sweeping or filling with gas the insulation volume 13 of the storage tank 1, on the bottom wall 2 to the insulation volume 13 located on the peripheral wall 6.

According to a characteristic of the invention, the at least one nozzle 28 is capable to reduce gas pressure at the nozzle 28 outlet with respect to gas pressure at the inlet of said nozzle 28. A section of the nozzle outlet 28 is strictly above a section of the nozzle inlet 28, the inlet and outlet of the nozzle 28 being defined according to gas flow propagation inside the nozzle 28.

The outlet of the at least one nozzle 28 is placed according to a distance D, as shown on FIG. 2, included between 200 mm and 5000 mm from the circular pipe 26. Such features of the nozzle 28, ensure a stable gas flowrate at least inside the circular pipe 26 and at the nozzle outlet 28. According to a nonlimiting example of the invention, gas pressure at the nozzle inlet 28 is 200 mbar, while it is 25 mbar at the nozzle outlet 28.

According to the example of the invention shown on FIGS. 1 and 2, the gas injection system 24 includes a plurality of nozzles 28, as described above. They are arranged around the circular pipe 26 in such a way that each one of the nozzles 28 must be distant from one another according to an angle G, as shown on FIG. 2, this angle being included between 25° and 70° around the axis of revolution R of the storage tank 1. In other words, each angular sector of the bottom wall 2 of the storage tank 1, has an angle included between 25° and 70° around the axis of revolution R and is bordered by a nozzle 28. Gas is thus injected homogenously into the space 20 and the insulation volume 13 since the nozzles 28 are distributed in an optimal manner around the circular pipe 26.

According to the invention, the gas injection system 24 includes at least a supply system 30 supplying gas to the circular pipe 26. Such a system comprises the pipes and tubes that are necessary to supply gas to the circular pipe 26 as explained above.

The supply system 30 includes at least one distribution ring 32, as shown on FIG. 1, which extend around the axis of revolution R of the storage tank 1 in such a way that gas is distributed all around the storage tank 1. As shown by a first example of the invention on FIG. 1, the distribution ring 32 is expanding on the peripheral wall 6 of the storage tank 1. The distribution ring 32 can then be placed at various heights on the peripheral wall 6 in the axial direction A of the storage tank 1, which enables adaptation to the various configurations of the storage tank 1. Furthermore, and according to a second example of the invention not shown, the distribution ring can expand on the peripheral edge of the upper surface as mentioned above.

The distribution ring 32 is linked, flow-wise, to a unit storing 33 the gas to be injected, this unit being placed outside the storage tank 1.

The supply system 30 also includes at least one supply pipe 34 which extend in the space 20 in such a way that this supply pipe connects the circular pipe 26 with the distribution ring 32 flow-wise. More precisely, the supply pipe 34 is spreading in the space 20 beneath one of the radial corrugations 18*b* of the sealed and corrugated membrane 14 on the bottom wall 2, as shown on FIG. 2. According to the example of the invention shown on FIG. 1, the supply pipe 34 is also extending in the space beneath one of the axial corrugations 18*c* of the sealed and corrugated membrane 14 on the peripheral wall 6 which is expanding in the extension of the above-mentioned radial corrugation.

According to the example of the invention shown on FIG. 1, the supply system 30 can include two supply pipes 34 placed in opposite positions to one another and with respect to the axis of revolution R of the storage tank 1. Configuring the supply system 30 in this way, enables, inter alia, to improve gas distribution to the circular pipe 26 by providing gas at two opposite points.

According to an example of the invention shown on FIGS. 1 and 2, the injection system 24 includes at least one injection device 36 which extends within a perimeter E defined by the circular pipe 26. More precisely, the injection device 36 is spreading from the circular pipe 26 and in direction of center C of the bottom wall 2 of the storage tank 1.

The injection device 36 is extending beneath one of the radial corrugations 18*b* of the sealed and corrugated membrane 14 on the bottom wall 2. The injection device 36 can extend radially in the extension of a supply pipe 34 running beneath a radial corrugation 18*b* of the corrugated membrane provided to the bottom wall 8. The injection device 36 includes at least one additional nozzle 38 placed at one of its ends that is spreading within a perimeter E as delimited by the circular pipe 26 and at the opposite of the latter. With this additional nozzle 38, gas can be injected within a perimeter E delimited by the circular pipe 26. Sweeping or filling the entire space 20 with injected gas is then possible, the entire space 20 being formed between the corrugations 18 of the sealed and corrugated membrane 14 and the thermal insulation barrier 12, and consequently the entire insulation volume 13 of the storage tank 1.

A process which consists of injecting gas into the storage tank 1 shall now be described in relation to FIGS. 1 to 3. It is understood that gas can be injected when checking tightness of the sealed and corrugated membrane or during the inerting process of the storage tank 1.

When carrying out this process, the gas stored in the gas storage unit is injected into the distribution ring 32 at a pressure ranging, for example, from 170 mbar to 230 mbar. The gas injected into the distribution ring 32 flows vertically and then radially inside, at least, one supply pipe 34 until gas is reaching the circular pipe 26. Once there is gas in the circular pipe 26, it is injected by the at least one nozzle 28 into the space 20 formed between the corrugations 18 of the sealed and corrugated membrane 14 and the thermal insulation barrier 12. More precisely, the gas is injected by the at least one nozzle 28 in such a way that gas pressure is ranging between 20 mbar and 30 mbar at the nozzle outlet 28. Such a pressure at the nozzle outlet 28 enables to improve gas flowing inside the entire space 20 of the storage tank 1 as well as inside the insulation volume 13 of the storage tank 1.

With gas diffusing inside the insulation volume 13 of the storage tank 1, it is thus possible to check whether there is any leak on the sealed and corrugated membrane 14 or to carry out a storage tank 1 inerting process when the tank is filled with liquefied gas in its inner volume 10.

In this respect, at the end of the injection process, a gas extraction process is carried out to collect the gas injected by the at least one nozzle 28 into the space 20 and the insulation volume 13 of the storage tank 1.

The gas extraction process is carried out by an extraction system 40 shown on FIG. 1, including at least one circular extraction pipe 42 which extends around the axis of revolution R of the storage tank 1, and outside the inner volume 10 of this tank. More specifically, the circular extraction pipe 42 is spreading around the peripheral wall 6 of the storage tank 1.

Furthermore, the extraction system 40 includes at least one extraction pipe 44 partly passing through the peripheral wall 6 of the storage tank 1, said extraction pipe 44 being connected, flow-wise, to the circular extraction pipe 42. More specifically, the extraction pipe 44 is extending into the thermal insulation barrier 12. It is thus understood that the extraction pipe 44 enables to trap the injected gas inside the insulation volume 13 of the storage tank 1. The gas trapped inside at least one extraction pipe 44 is thus directed into the circular extraction pipe 42, the latter being connected to the gas collecting and/or analysis system 46, the purpose of which is to collect and/or to analyze the discharged gas from the insulation volume 13 of the storage tank 1.

Analyzing gas means, in particular, the analysis of its components such as ammonia or helium within the framework of the process aiming at checking tightness of the sealed and corrugated membrane 14 or nitrogen during the storage tank 1 inerting process. For example, if a type of gas different from the above-mentioned ones used for checking tightness of the corrugated membrane 14 is detected, this means that there is a leak on this membrane.

According to an example of the invention, the extraction system 40 includes two extraction pipes 44 located in opposite positions one another and radially with respect to the axis of revolution R of the storage tank 1. Such a configuration of the extraction system 40 makes it possible to optimize gas trapping inside the insulation volume 13 of the storage tank 1.

Nevertheless, the invention which has just been described, cannot be only limited to the configurations and means as shown and explained above but it can also apply to other equivalent means and configurations or any combination of such means or configurations.

The invention claimed is:

1. A storage tank for a fluid, the liquefaction temperature of which is lower than −50° C. under atmospheric pressure, the storage tank has a cylindrical shape around an axis of revolution with a bottom wall, an upper wall and a cylindrical peripheral wall connecting the bottom wall to the upper wall, said storage tank comprising at least one thermal insulation barrier covered with a sealed and corrugated membrane and in such a way that the sealed and corrugated membrane delimits an inner volume of the storage tank; the sealed and corrugated membrane including a plurality of corrugations that are used to delimit a space between said corrugations and the at least one thermal insulation barrier, the storage tank including at least a gas injection system injecting gas into the space, wherein the gas injection system comprises at least one circular pipe spreading around the axis of revolution of the storage tank, said circular pipe being located in the space delimited by the corrugations of the sealed and corrugated membrane of the bottom wall and the thermal insulation barrier, the gas injection system comprising at least one nozzle linked, flow-wise, to the circular pipe and in such a way that the at least one nozzle injects gas beneath the corrugations of the sealed and corrugated membrane.

2. The storage tank as claimed in claim 1, wherein the gas injection system includes at least one supply system supplying gas to the circular pipe, the supply system comprising at least one distribution ring spreading around the axis of revolution.

3. The storage tank as claimed in claim 2, wherein the supply system comprises at least one supply pipe extending mainly in the space of the peripheral wall and in such a way that this supply pipe connects, flow-wise, the circular pipe to the distribution ring.

4. The storage tank as claimed in claim 3, wherein the bottom wall includes a peripheral edge and a center aligned with the axis of revolution of the storage tank, the circular pipe being placed closer to the center of the bottom wall than to the peripheral edge.

5. The storage tank as claimed in claim 4, wherein the at least one nozzle is injecting gas beneath the corrugations of the sealed and corrugated membrane of the bottom wall and in direction of the peripheral edge.

6. The storage tank as claimed in claim 2, wherein the bottom wall includes a peripheral edge and a center aligned with the axis of revolution of the storage tank, the circular pipe being placed closer to the center of the bottom wall than to the peripheral edge.

7. The storage tank as claimed in claim 6, wherein the at least one nozzle is injecting gas beneath the corrugations of the sealed and corrugated membrane of the bottom wall and in direction of the peripheral edge.

8. The storage tank as claimed in claim 6, wherein the sealed and corrugated membrane is configured in such a way that its corrugations formed at the peripheral wall are in communication, flow-wise, with the corrugations formed at the bottom wall.

9. The storage tank as claimed in claim 7, wherein the at least one nozzle is adapted to reduce gas pressure at the outlet of said nozzle with respect to gas pressure at the inlet of said nozzle.

10. The storage tank as claimed in claim 1, wherein the at least one nozzle is placed away from the circular pipe, at a distance ranging from 200 mm to 5000 mm.

11. The storage tank as claimed in claim 1, wherein the sealed and corrugated membrane, at least, placed on the bottom wall comprises circular corrugations spreading around the axis of revolution of the storage tank and radial corrugations crossing the circular corrugations, and extending in a radial direction of the storage tank, the circular pipe extending at least beneath one of the circular corrugations of the sealed and corrugated membrane.

12. The storage tank as claimed in claim 11, wherein an injection axis of the at least one nozzle is aligned with a main axis of a radial corrugation of the sealed and corrugated membrane placed on the bottom wall.

13. The tank (1) as claimed in claim 11, wherein the gas injection system includes at least one supply system supplying gas to the circular pipe, the supply system comprising at least one distribution ring spreading around the axis of revolution, wherein the supply system comprises at least one supply pipe extending mainly in the space of the peripheral wall and in such a way that this supply pipe connects, flow-wise, the circular pipe to the distribution ring, and wherein the at least one supply pipe is extending in the space beneath one of the radial corrugations of the sealed and corrugated membrane of the bottom wall.

14. The storage tank as claimed in claim 1, wherein the gas injection system comprises at least one injection device extending within a perimeter delimited by the circular pipe.

15. The storage tank as claimed in claim 14, wherein the at least injection device comprises at least one additional nozzle placed at one of its ends located inside the perimeter delimited by the circular pipe, said additional nozzle injecting gas at least into the perimeter delimited by the circular pipe.

16. The storage tank as claimed in claim 1, including a plurality of nozzles placed around the circular pipe and in such a way that each nozzle is distant from one another with respect to an angle ranging between 25° to 70° around the axis of revolution of the storage tank.

17. The storage tank as claimed in claim 1, comprising at least one extraction system provided with at least one circular extraction pipe which is extending around the axis of revolution of the storage tank, outside of its inner volume, the extraction system including at least one extraction pipe that passes through, at least partly, the peripheral wall of the storage tank up to the thermal insulation barrier, the extraction pipe being linked, flow-wise, to the circular extraction pipe.

18. A process for checking the tightness of a sealed and corrugated membrane of a storage tank as claimed in claim 1, this process using at least the gas injection system.

19. A process for sweeping at least an insulation volume of a storage tank as described in claim 1, the process using at least the gas injection system.

20. A process for injecting gas into a space of a storage tank, as described in claim 1, and according to which gas is injected into the gas injection system in such a way that the gas flows at least inside the circular pipe at a pressure ranging between 170 mbar and 230 mbar and in such a way that gas goes out by at least one nozzle at a pressure ranging between 20 mbar and 30 mbar.

* * * * *